(12) United States Patent
Carlson et al.

(10) Patent No.: US 7,487,862 B2
(45) Date of Patent: Feb. 10, 2009

(54) SNAP IN ABS EXCITER RING

(75) Inventors: Bradley S. Carlson, Fort Wayne, IN (US); Ryan M. Fritts, Ossian, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/220,435

(22) Filed: Sep. 7, 2005

(65) Prior Publication Data

US 2007/0051571 A1 Mar. 8, 2007

(51) Int. Cl.
*F16D 65/12* (2006.01)
(52) U.S. Cl. .............................. 188/218 XL; 188/18 A; 301/105.1
(58) Field of Classification Search ............... 188/18 A, 188/18 R, 181 A, 181 R, 218 XL; 301/105.1; 164/111; 324/173; 403/326, 329
See application file for complete search history.

(56) References Cited

U.S. PATENT DOCUMENTS

| 4,534,088 | A | * | 8/1985 | Ricke | ........................... 24/295 |
| 4,840,291 | A | * | 6/1989 | Merlin | ......................... 221/59 |
| 4,898,493 | A | * | 2/1990 | Blankenburg | ............... 403/326 |
| 5,067,597 | A | * | 11/1991 | Young | .................... 188/181 R |
| 5,263,900 | A | * | 11/1993 | Stimson | .................. 188/181 R |
| 5,760,575 | A |   | 6/1998 | Kumamoto et al. | |
| 6,568,512 | B1 | * | 5/2003 | Tolani | .................. 188/218 XL |
| 6,619,440 | B2 | * | 9/2003 | Antony et al. | ................. 188/17 |
| 6,945,367 | B1 | * | 9/2005 | Yuhas | ....................... 188/18 R |
| 7,219,778 | B2 | * | 5/2007 | Pete et al. | ............. 188/218 XL |
| 2004/0184876 | A1 | * | 9/2004 | Hessel et al. | ................ 403/326 |
| 2006/0091723 | A1 | * | 5/2006 | Pete et al. | ................ 303/113.1 |

FOREIGN PATENT DOCUMENTS

| DE | 42 30 012 A1 | 3/1994 |
| DE | 44 02 959 A1 | 6/1995 |
| DE | 101 45 947 C1 | 11/2002 |
| DE | 102 37 504 A1 | 3/2004 |

OTHER PUBLICATIONS

European Patent Search Report from Application No. 06017574.2-1523, dated Jan. 14, 2008 (9 pages).

* cited by examiner

*Primary Examiner*—Robert A. Siconolfi
*Assistant Examiner*—James K Hsiao
(74) *Attorney, Agent, or Firm*—Mark C. Bach; Jeffrey P. Calfa

(57) ABSTRACT

An exciter ring/disc brake rotor assembly allows snap in fitting of the exciter ring onto the disc brake rotor. Either of two snap fit mechanisms limits clocking of the ring in use.

9 Claims, 9 Drawing Sheets

SNAP IN ABS EXCITER RING

BACKGROUND OF THE INVENTION

1. Technical Field

The invention relates to anti-lock brake systems for motor vehicles and more particularly to an exciter ring and disc brake rotor assembly which allows snap in fitting and retention of the exciter ring on the disc brake rotor.

2. Description of the Problem

Brake units for motor vehicles should provide smooth braking with reasonable service life. In some applications this need has been met with disc brakes. The cost effectiveness of disc brake systems depends in part on making the components out of easily worked, inexpensive material. Disc brake rotors have generally been made from relatively inexpensive gray iron castings. Gray iron is, however; highly susceptible to corrosive attack, particularly in the operating environment of vehicles where brake components are open to the air, subject to substantial transient heating and exposed to water and salt water spray. In regular use, the working surfaces of the discs are rubbed clean by contact with the disc pads, which are typically made of a composite material and which rub off corroded areas. However, other areas of the brake discs are not swept by the brake pads and are not regularly cleaned. Prior to anti-lock braking systems, such concerns were not paramount with brakes which were frequently in use, since the rotor is a regularly replaced part and the remaining areas subject to attack were not critical.

With the advent of anti-lock braking systems (ABS) other sections of the disc brake rotor take on importance, particularly the anti-lock brake system exciter ring. The exciter ring is a cylindrical section of the rotor having a common axis of rotation with the rotor. A plurality of teeth are formed in a ring, which is flat in the plane of rotation of the rotor to pass closely by a stationary sensor. One type of sensor used is a variable reluctance sensor which generates an electrical pulse train as a function of the varying magnetic flux leakage between the sensor head and the exciter ring. In this system the frequency of the resulting electrical pulse train indicates the rotational speed of the wheel on which the rotor is mounted. The generation of clean pulse train is greatly aided by having teeth of uniform shape, size and spacing. Where the ring is cast as one piece with the rotor, corrosion of the rotor can compromise all of these factors, resulting in difficulty in detecting the passage of teeth and gaps and causing generation of an irregular pulse train.

The problem of corrosion of exciter rings for anti-lock brake systems is not limited to disc brake systems, but is also an issue with drum brakes. In drum brakes the exciter ring has not been an integral part of the drum, but rather has been a separate part, press fitted on the end of a wheel hub. Press fitted parts can readily be made of material more corrosion resistant than gray iron, such as a mild low carbon steel. However, the press fitting of rings onto disc rotors has proven less successful than it has for hubs using drum brakes. The difficulty stems from the fact that in disc brake systems the exciter ring is in direct contact with the rotor, which is part of the active brake assembly, whereas the axle hub using drum brakes is not a brake component. On drum systems less heat is transferred from the hub which carries the exciter ring than is transferred in disc systems from the rotor to an exciter ring. Exciter rings are made of low carbon steel which has a different thermal coefficient of expansion than does iron. The difference in coefficients of expansion in the materials used for the ring and the hub or rotor causes more problems in disc brake systems than in drum systems since more heat is transferred by a rotor to a ring than by a hub to a ring and thus an exciter ring and rotor vary more in size in relation to each other than do an exciter ring and a hub. An exciter ring which loses its tight fit with a rotor can begin to clock (i.e., the ring rotates relative to the rotor). If a ring rotates on a rotor, the ring will not reflect actual wheel rotational velocity. This affects ABS operation. Such a ring could also "pop" off.

SUMMARY OF THE INVENTION

According to the invention there is provided a snap in ABS exciter ring for fitting to a cast gray iron disc rotor. The ABS exciter ring is preferably fabricated in a stamping from low carbon steel, which exhibits substantially greater resistance to corrosion than does the disc rotor. However, the exciter ring may also be made of stainless steel or any other materials. Tangs extend from one side of the exciter ring for engaging the disc rotor. The embodiments of the invention differ in the details of the capture mechanism between the tangs and an interior surface of the rotor. In one embodiment, projecting parts of the tangs snap into indentations machined into the surface of the rotor. The attachment provides a positive lock of the ring to the rotor. The only modification required of rotors is limited machining. In a second embodiment the tangs engage beads projecting from the rotor.

Exciter rings in accordance with the invention are readily fabricated in different sizes to accommodate rotors of differing sizes. No loose fasteners are required for installation.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
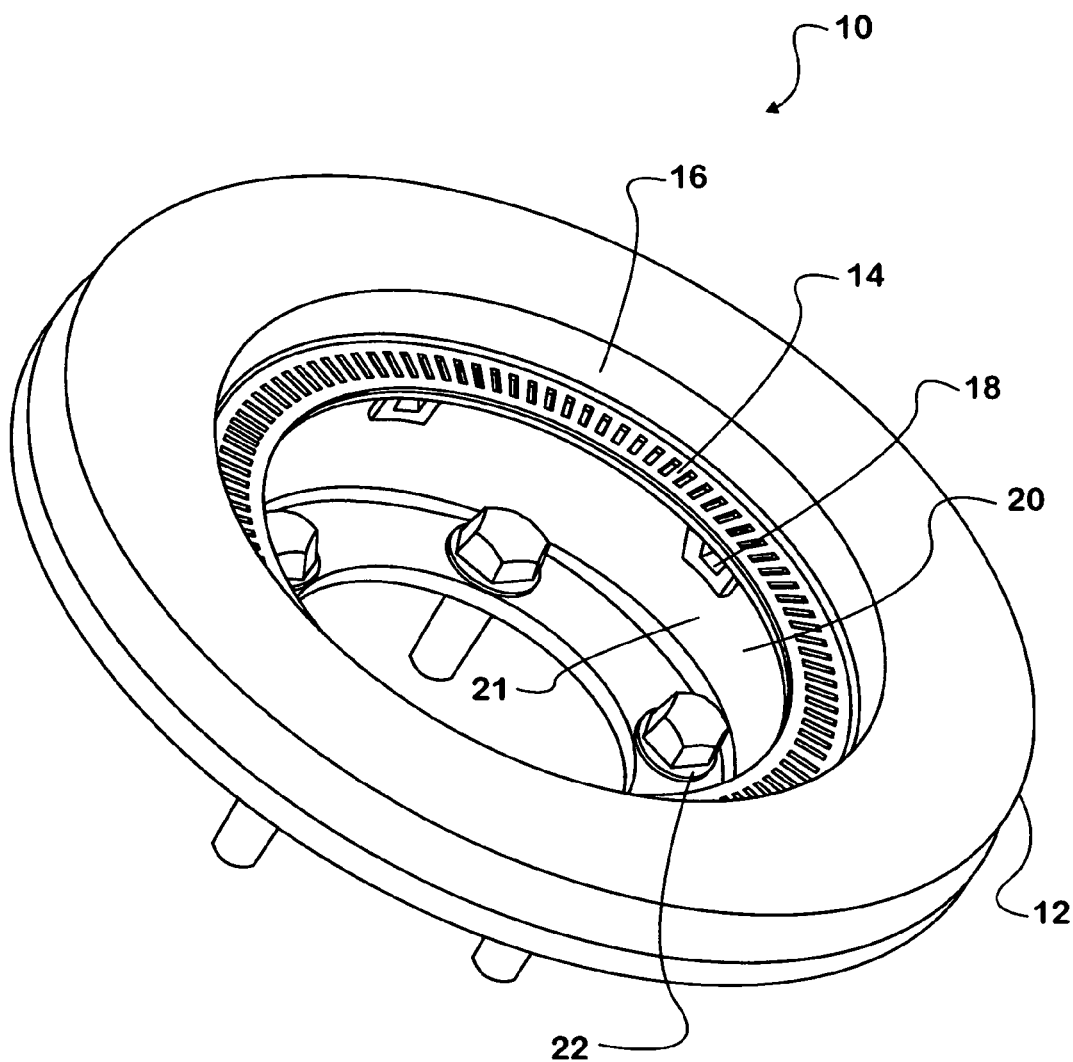
FIG. 1 is a perspective view of a rotor/exciter ring assembly in accordance with the invention.

Referring now to the figures and in particular to FIG. 1, an assembly 10 of a rotor 12 and an exciter ring 14 for a disc brake is shown. Exciter ring 14 is situated in a recess 16 in rotor 12, flat along one side of the ring against a shelf 24 (see FIG. 2). Shelf 24 is formed in rotor 12 during casting. Five tangs 18 are shown extending from an inner circumference 17 (see FIG. 3) of exciter ring 14. The number of tangs may be varied. The rings are preferably set at an oblique angle of 90 to 110 degrees with respect to the plane of the ring, and engage with rotor 12. The precise configuration of tangs 18 and the manner of attachment of ring 14 to rotor 12 also varies between the two preferred embodiments. Rotor 12 is a gray iron casting. Rotor 12 provides a wearable surface 22 which pads of the disc brake close on and wear against. Exciter ring 14, in both embodiments, is a stamped piece of mild low carbon steel, snap fit by tangs 18 onto the rotor and retained in position by the tangs. Exciter ring 14 is set as a recess 20 in rotor 12 centered within wearable surface 22.

Figure 2:
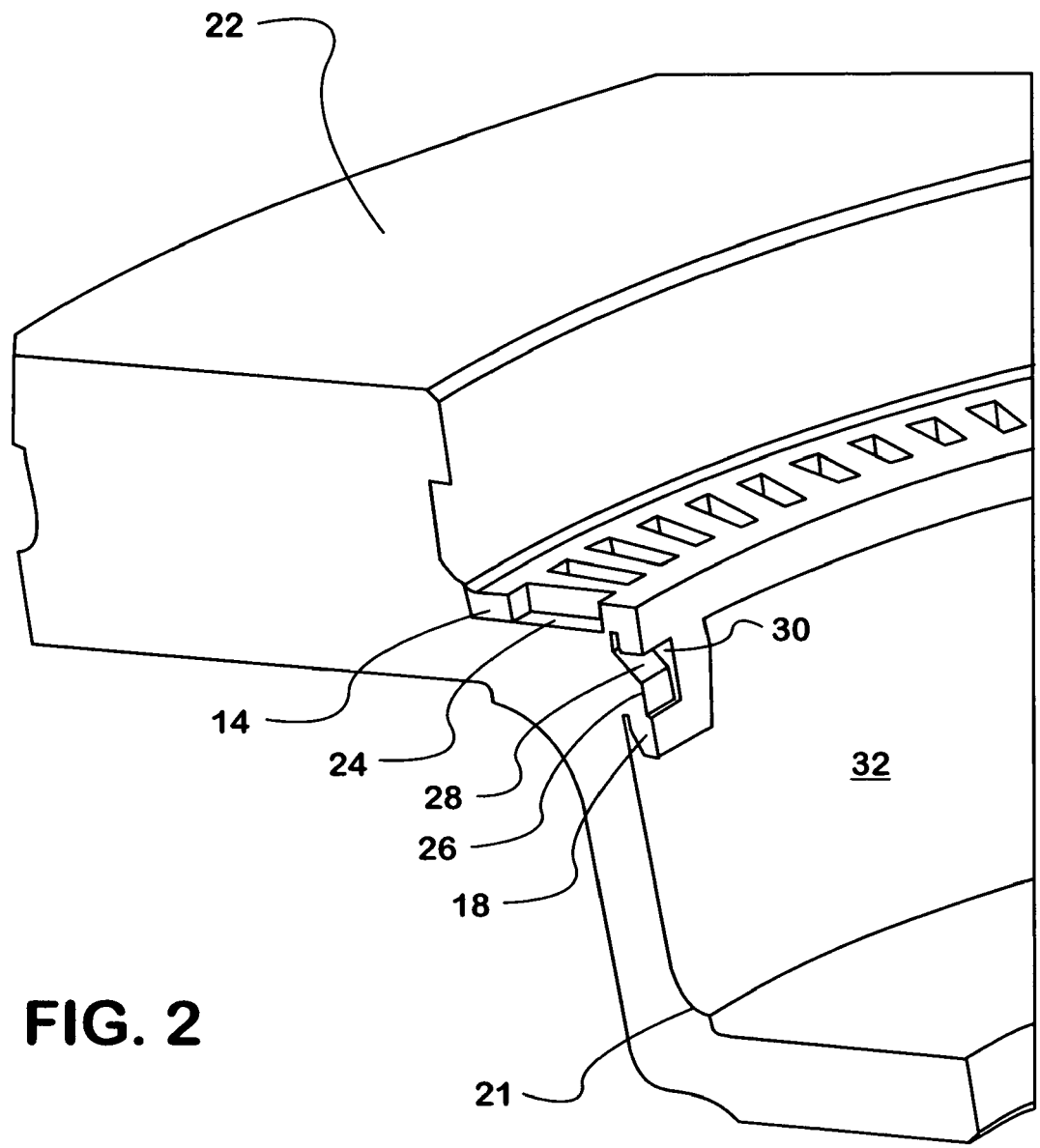
FIG. 2 is a perspective view in partial cutaway illustrating mating of the exciter ring to the disc brake rotor in accordance with a first of two preferred embodiments of the invention.
Figure 3:
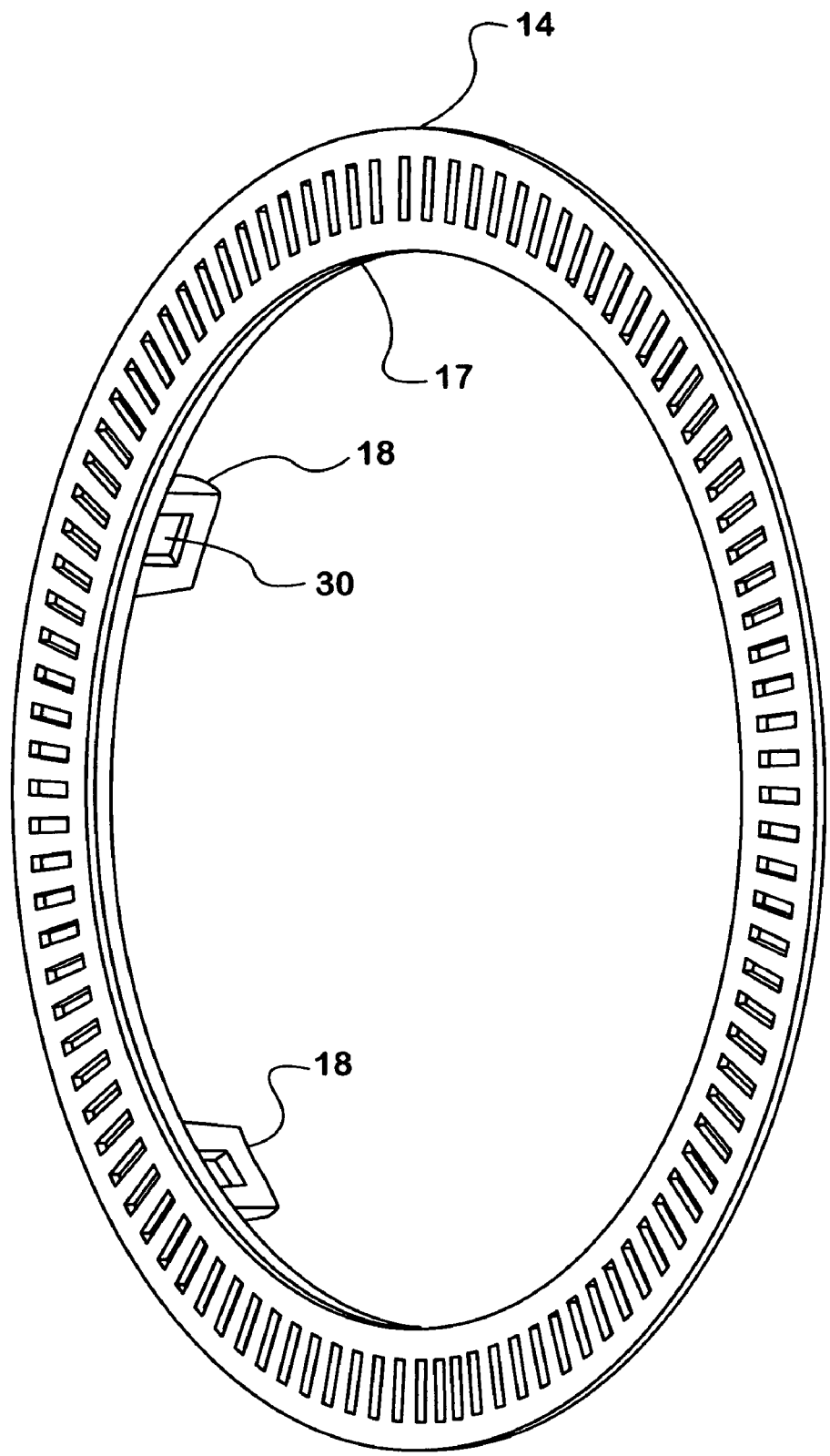
FIG. 3 is a perspective view of an exciter ring in accordance with the first embodiment of the invention.
Figure 4:
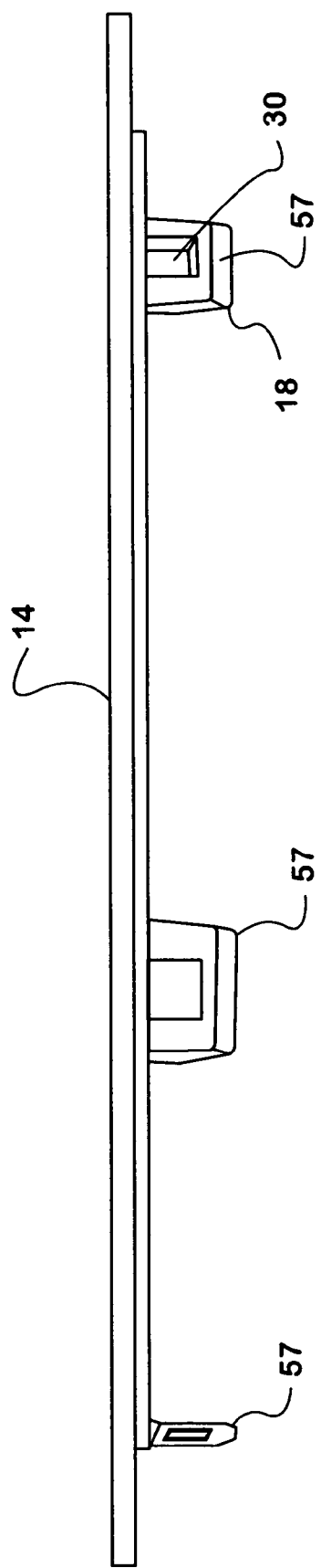
FIG. 4 is a side elevation of the exciter ring of FIG. 3.
Figure 5:
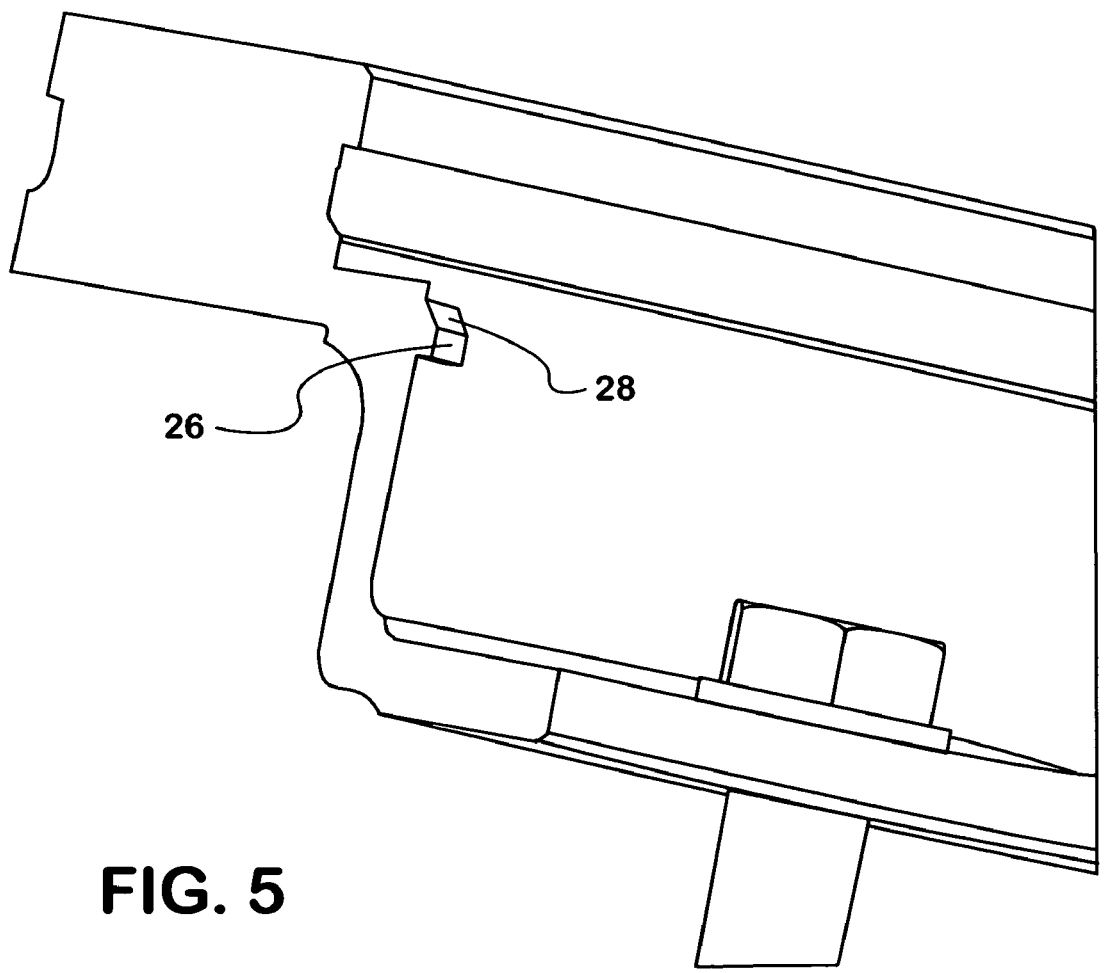
FIG. 5 is a section view of a rotor constructed in accordance with the first embodiment.
Figure 6:
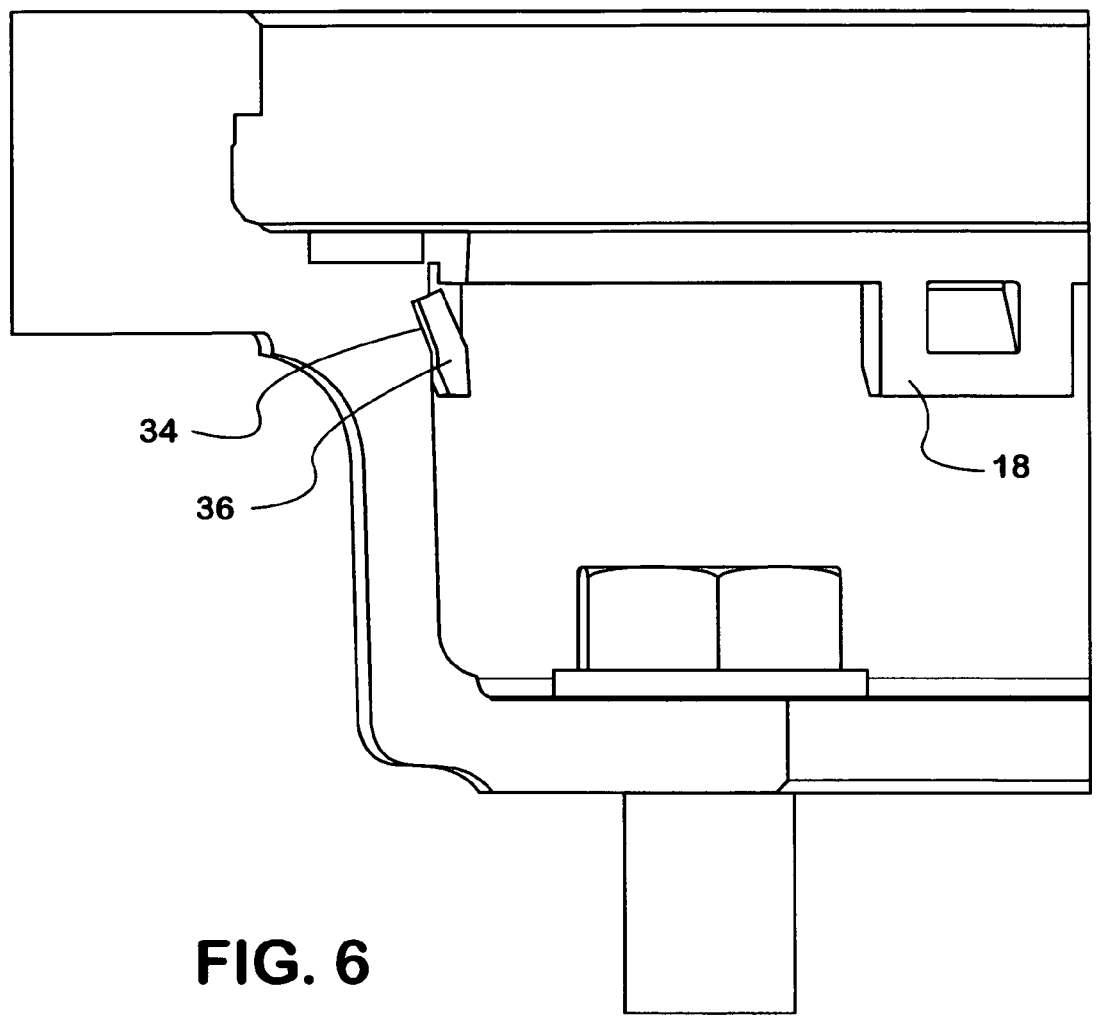
FIG. 6 is a cutaway view of rotor/exciter ring assembly in accordance with a second embodiment of the invention.

Referring to FIGS. 2-5, details of exciter ring 14 and rotor 12 relating to capture between the elements are illustrated. In FIG. 2, exciter ring 14 is held along one major side to a shelf 24. One of tangs 18 is seen extending from the inner circumference 17 of exciter ring 14 into a deeper recess 20 in rotor 12. Tang 18 abuts along one side the inner cylindrical surface 21 of the deeper recess 20. Extending radially inwardly from the cylindrical surface 21 into recess 20 is a bead 26. Tang 18 operates as a catch, its sides defining an aperture 30 parallel to the interior surface forming recess 21. Tang 18 is captured on a bead 26 upon aligning the aperture 30 with the bead 26, holding the exciter ring 14 in place on rotor 12. Capture is assisted by the profile of bead 26, which has a bevel 28 facing the direction from which tang 18 is fitted into the recess 20. Beveled faces 57 are also applied to leading edges of the tangs 18. Upon introduction of the ring 14 into recess 16 each tang 18 is rotated into alignment with a bead 26 in the deeper recess 21. As ring 14 is moved axially into rotor 12 tangs 18 encounter the beveled surfaces 28 of the trapezoidally shaped beads 26 and ride up and over the beads before snapping down the far edge of the bead. A trapezoidal shape is not required. Only some sort of allowance between the ring and rotor is required. Beads 26 may be seen to not be a continuous ring, but as isolated raised points. This configuration serves to keep ring 14 from clocking.

This first embodiment of the invention produces highly secure attachment between tang and rotor, but requires modification of molds in which rotors are cast to produce the beads 26.

Figure 7:
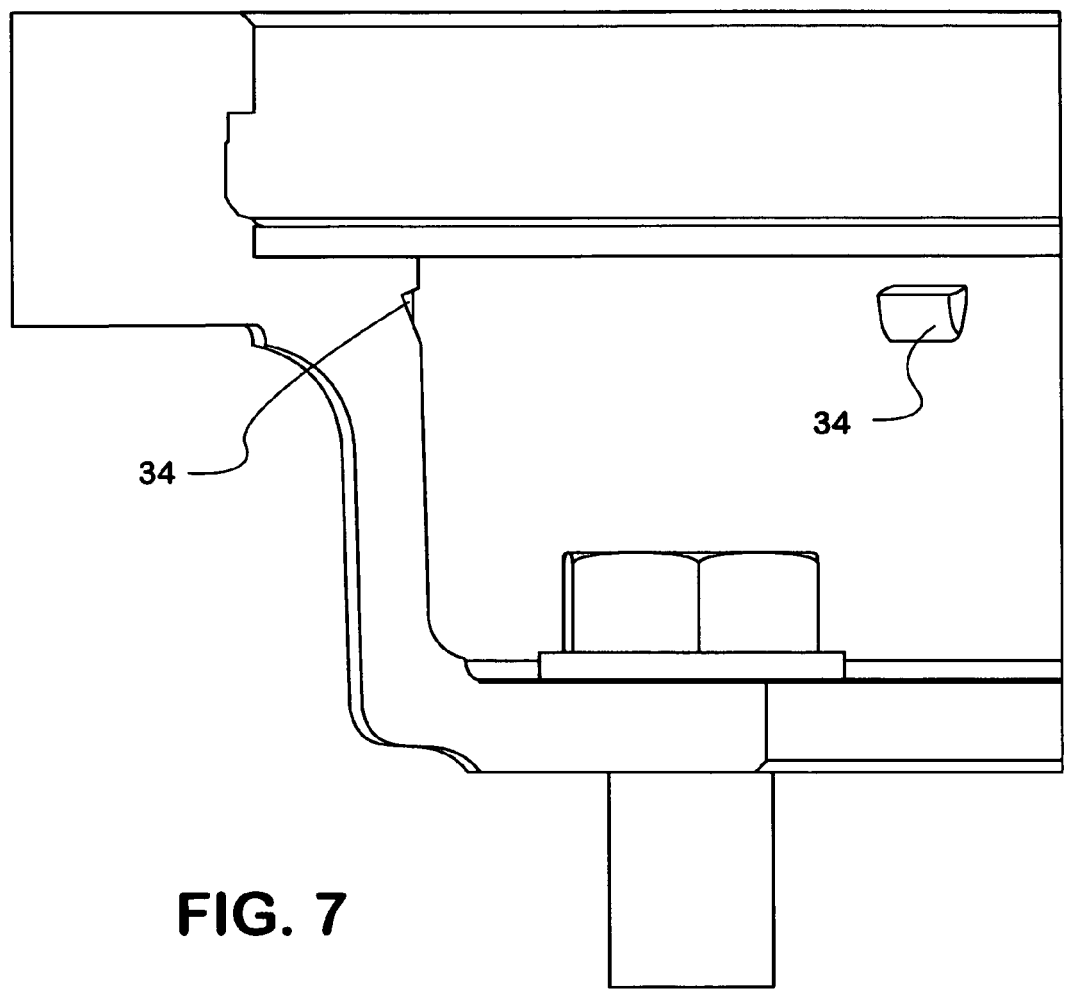
FIG. 7 is a cutaway view of the rotor of FIG. 6.
Figure 8:
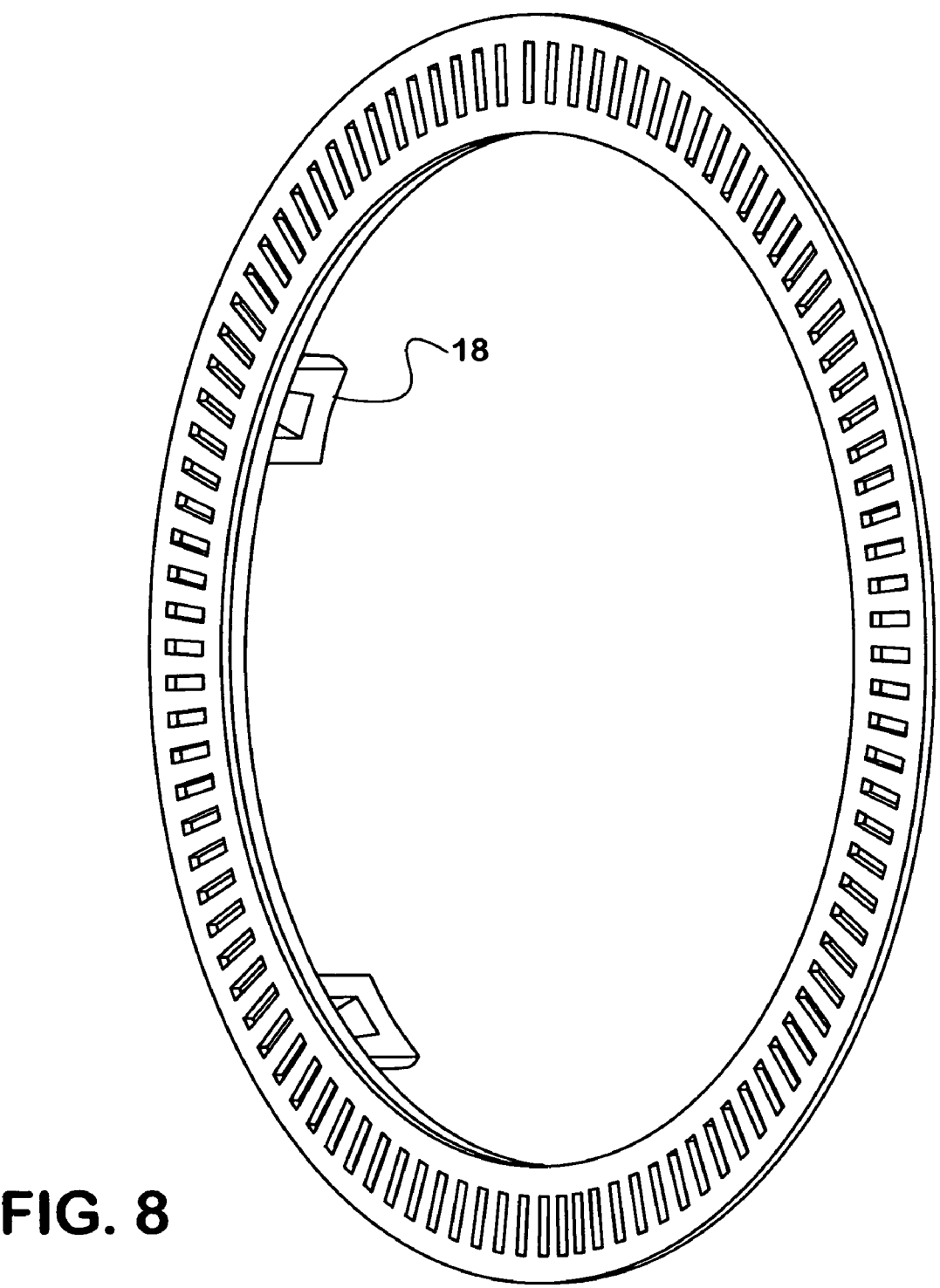
FIG. 8 is a perspective view of the exciter ring for the second embodiment.
Figure 9:
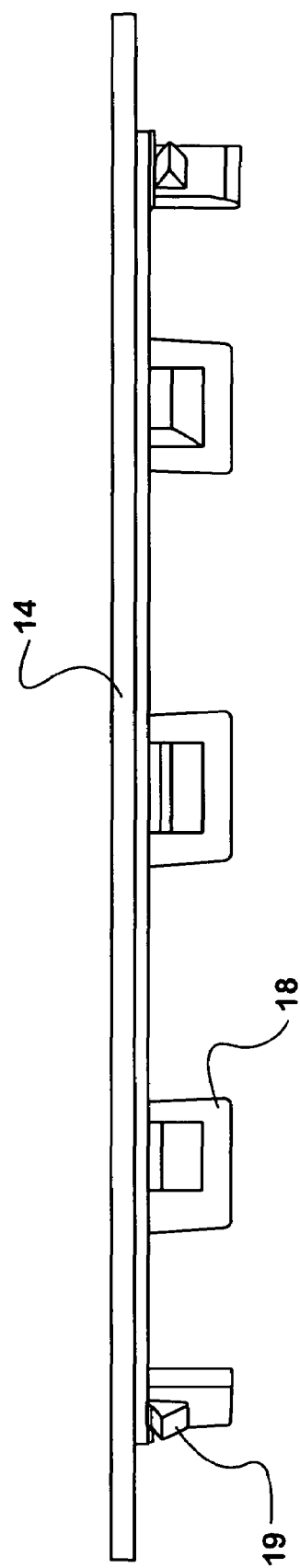
FIG. 9 is a side elevation of the exciter ring of FIG. 8.

Referring to FIGS. 6-9, a second embodiment of the invention is illustrated. To avoid the expense of modifying molds to provide beads 26 on rotor 12 surfaces, indentations 34 may be machined into the cylindrical interior surface 21 of rotors 12. Exciter rings 14 are then modified to attach to the indentations 34, as best seen in FIG. 7. Indentations 34 are radially distributed around the cylindrical surface 21. As seen in FIGS. 8 and 9, tangs 18 are modified to incorporate radially outwardly oriented projections 19 which are sized to fit into indentations 34. Projections 19 have a base inside tang 18 and extend outwardly toward the main body of exciter ring 18. Projections 19 can be seen to be partially punched out of the tangs, leaving an opening into which the projections can be pushed. Since the tangs 18 lead introduction of an exciter ring 14 to a rotor 12, the projections flatten into the openings in the tangs 18 as the ring is pushed into position on rotor 12. The projections 19 are, in effect, torsion springs which snap out along the trailing edge into indentations 34.

The first embodiment of the invention emphasizes a secure attachment of the exciter ring 14 to a rotor 12 to minimize any prospect of clocking of the ring. The second embodiment of the invention costs less to produce than the first.

While the invention is shown in only two of its forms, it is not thus limited but is susceptible to various changes and modifications without departing from the spirit and scope of the invention.

What is claimed is:

1. A disc brake rotor assembly comprising:
   a cast iron rotor for rotation about an axis, the cast iron rotor having a cylindrically shaped interior surface and a plurality mutually isolated exciter ring engagement points distributed around the cylindrically shaped interior surface; and
   an exciter ring made of a corrosion resistant material, which exhibits a different thermal coefficient of expansion than does the iron of the rotor, which is flattened to define opposite major surfaces and which has a plurality of tangs arranged radially with respect to one another and extending from one major surface for snap fit engagement with the plurality of engagement points on the cylindrically shaped interior surface of the cast iron rotor; and
   the snap fit engagement providing resistance to removal of the exciter ring after fitting of the exciter ring to the rotor and preventing clocking of the exciter ring on the rotor even notwithstanding thermally related differential expansion of the cast iron rotor and the exciter ring.

2. A disc brake rotor assembly as set forth in claim 1, further comprising:
   a plurality of indentations in the cylindrically shaped interior surface, the plurality of indentations being coplaner and radially distributed about the cylindrically shaped interior surface to provide a plurality of catches corresponding to the engagement points;
   the exciter ring being inserted in an orientation to bring each of the plurality of tangs into alignment with a different one of the plurality of indentations; and
   a retaining element projecting outwardly from each tang into engagement with the adjacent indentation to provide a plurality of beads.

3. A disc brake rotor assembly as set forth in claim 1, further comprising:
   a plurality of beads extending away from the cylindrically shaped interior surface, the plurality of beads being coplaner and radially distributed about the cylindrically shaped interior surface to provide the engagement points;
   the exciter ring being inserted in an orientation aligning each of the plurality of tangs with a different one of the plurality of beads; and
   an opening in each tang for functioning as a catch into which one bead is fitted for retaining the exciter ring in place.

4. A disc brake rotor assembly as set forth in claim 3, further comprising:
   the beads having a beveled surface facing a direction from which the tangs are introduced.

5. A method of fabricating a disc brake rotor assembly, the method comprising the steps of:
   providing a rotor having a cylindrically shaped interior surface;
   stamping an exciter ring made of a material which is relatively corrosion resistant compared to the rotor, flattened to define opposite major surfaces and provided with radially arranged tangs extending from one of the major sides of the exciter ring;
   fitting the exciter ring onto the rotor with the tangs extending into an interior of the rotor defined by the cylindrically shaped interior surface and into snap fit engagement with the cylindrically shaped interior surface for retention of the exciter ring on the rotor; and
   modifying the interior surface to provide a plurality isolated engagement points positioned around the interior surface to allow the each tang to be aligned with an engagement point upon fitting, the tangs and engagement points cooperating to prevent unintended withdrawal of the exciter ring and autorotation of the exciter ring notwithstanding differing differing thermal responses of the rotor and the exciter ring in use.

6. A method of fabricating a disc brake rotor assembly as set forth in claim 5, wherein the step of providing a rotor includes:

including a plurality of indentations in the cylindrically shaped interior surface, the plurality of indentations being coplaner and radially distributed about the cylindrically shaped interior surface;

positioning the exciter ring to position the tangs into contact with the cylindrically shaped interior surface with each of the plurality of tangs aligned on a different one of the plurality of indentations; and the step of stamping an exciter ring including providing a cooperating retaining element projecting outwardly from each tang for engagement with its adjacent indentation.

7. A method of fabricating a disc brake rotor assembly as set forth in claim 5, wherein the step of providing a rotor includes:

casting the rotor in a mold defining a plurality of beads on the cylindrically shaped interior surface, the plurality of beads being coplaner and radially distributed about the cylindrically shaped interior surface;

inserting the exciter ring rotated to bring each of the plurality of tangs into alignment with a different one of the plurality of beads;

providing an opening in each tang as a catch; and fitting each opening over a different one of the plurality of beads to retain the exciter ring in place.

8. A method of fabricating a disc brake rotor assembly as set forth in claim 7, further comprising the steps of:

shaping the bead to have a bevel disposed for displacing the tangs upwardly while the tang is initially moved over the bead.

9. A method of fabricating a disc brake rotor assembly as set forth in claim 5, the method comprising the further steps of providing a bevel on the ring.

* * * * *